US009426110B2

(12) United States Patent
Aalbers

(10) Patent No.: US 9,426,110 B2
(45) Date of Patent: Aug. 23, 2016

(54) AUTOMATIC DETERMINATION OF ADDITIONAL LANGUAGES USED IN SOCIAL NETWORKS

(71) Applicant: International Business Machines Corporation, Armonk, NY (US)

(72) Inventor: Huibert F. J. Aalbers, Mexico City (MX)

(73) Assignee: International Business Machines Corporation, Armonk, NY (US)

(*) Notice: Subject to any disclaimer, the term of this patent is extended or adjusted under 35 U.S.C. 154(b) by 19 days.

(21) Appl. No.: 14/448,099

(22) Filed: Jul. 31, 2014

(65) Prior Publication Data

US 2016/0036747 A1    Feb. 4, 2016

(51) Int. Cl.
    *G10L 15/06*     (2013.01)
    *H04L 12/58*     (2006.01)
    *G06F 17/27*     (2006.01)

(52) U.S. Cl.
CPC .............. *H04L 51/12* (2013.01); *G06F 17/275* (2013.01); *H04L 51/32* (2013.01)

(58) Field of Classification Search
CPC ...................................................... H04L 51/12
See application file for complete search history.

(56) References Cited

U.S. PATENT DOCUMENTS

| 2008/0168154 | A1* | 7/2008 | Skyrm | H04L 65/601 709/218 |
| 2011/0123015 | A1 | 5/2011 | Erhart et al. | |
| 2013/0006602 | A1 | 1/2013 | Zhu et al. | |
| 2014/0025752 | A1* | 1/2014 | Deluca | G06Q 50/01 709/206 |
| 2014/0039874 | A1* | 2/2014 | Pelosi | G06F 17/275 704/8 |
| 2015/0004944 | A1* | 1/2015 | Steeves | H04W 4/02 455/412.2 |

FOREIGN PATENT DOCUMENTS

WO     2009073856 A1     6/2009

OTHER PUBLICATIONS

Khapra et al., "Offering Language Based Services on Social Media by Identifying User's Preferred Language(s) from Romanized Text", WWW 2013 Companion, May 13-17, 2013, Rio de Janeiro, Brazil, ACM 978-1-4503-2038-2/13/05.

Mogollón, Irene Eleta, "Multilingual Use of Twitter: Language Choice and Language Bridges in a Social Network", Dissertation submitted to the Faculty of the Graduate School of the University of Maryland, College Park in partial fulfillment of the requirements for the degree of Doctor of Philosophy 2014, © Copyright by Irene Eleta Mogollón 2014.

(Continued)

*Primary Examiner* — Qian Yang
(74) *Attorney, Agent, or Firm* — Daniel R. Simek; Maeve M Carpenter

(57) ABSTRACT

A computer processor determines a first language in which a message posted on a social network is composed, the message corresponds to a user of a social network. The computer processor compares the first language of the message to a set of one or more languages understood by the user of the social network. In response to the first language of the message failing to match one language of the set of one or more languages understood by the user, the computer processor prompts the user to confirm continued use of the first language, within the social network.

13 Claims, 4 Drawing Sheets

(56) References Cited

OTHER PUBLICATIONS

"Method and System for Enhancing Translations in Social Networking Micro-blogs Sites", IP.com Prior Art Database Technical Disclosure, Authors Disclosed Anonymously, IPCOM000225964D, Mar. 17, 2013, pp. 1-4.

"Method for social media offerings based on language identification of romanized texts", IP.com Prior Art Database Technical Disclosure, Authors Disclosed Anonymously, IPCOM000225109D, Jan. 24, 2013, pp. 1-2.

* cited by examiner

AUTOMATIC DETERMINATION OF ADDITIONAL LANGUAGES USED IN SOCIAL NETWORKS

BACKGROUND OF THE INVENTION

The present invention relates generally to the field of communications, and more particularly to enabling the use of multiple languages by users participating in social network messaging.

Many Internet-based social networks are oriented to support users writing in English, or at best a single default language. The social networks are globally scalable, being based on Internet access, as long as a user's networking contacts post and read in the same language. This condition does not model the direction of the global environment in which many Internet-savvy users are able to communicate in more than one language.

To overcome the limitations of some social networking applications, users often take steps to circumvent the language limitations. Because social network application owners rely on information regarding their user populations, the existing limitations of language use and selection obscure useful information that is otherwise available.

SUMMARY

According to one embodiment of the present invention, there is provided a method, computer program product, and computer system for enabling use of multiple languages in social networks. A computer processor determines a first language in which a message posted on a social network is composed, the message corresponds to a user of a social network. The computer processor compares the first language of the message to a set of one or more languages understood by the user of the social network, and in response to the first language of the message failing to match one language of the set of one or more languages understood by the user, the computer processor prompts the user to confirm continued use of the first language, within the social network.

DETAILED DESCRIPTION

Embodiments of the present invention recognize the use of multiple communication channels to exchange communication messages. Communication channels for messages between users can include Internet-based sites in which text message content is displayed in a type of publishing that can be viewed by other users accessing the site, email, short message service (SMS), and audio messages, such as voice mail, for example. Messages can be directed to a user, broadcast to multiple users, often referred to as followers, or posted to a web site and accessed by users. Embodiments of the present invention, hereafter collectively refer to at least the messages using the above types of communication channels as messages of social networks. Discussions and examples presented herein are directed primarily to messages of text-based content for brevity and convenience; however, embodiments of the present invention are not limited to text-based content of social networks.

Embodiments of the present invention recognize that some social networks offer a single default language for a user, inconsistent with the global scale of social networking and the more common situation of users that are fluent in multiple languages. Some embodiments also recognize that owners of social network applications value the information associated with users of their applications; however, the limitations of some social network applications encourage users to workaround the limitations by using multiple profiles, each associated with a different language. The use of multiple profiles distorts the information that application owners value and find useful.

Embodiments of the present invention addresses the need for a social network user to address a global audience that often read and write (speak and listen), social network content in multiple languages. Embodiments determine the manner in which the social network content corresponds to the user. Some embodiments monitor a user's written posts and analyze the content to determine the language in which the post is written. The determined language of the post is compared to a previously defined set of languages indicated by the user to be understood fluently. Other embodiments monitor the language of postings the user views, is subscribed to, or indicates as following, and determines if the language matches one of the fluently understood set of languages.

If the determined language fails to match a social network language of the set of languages understood fluently by the user, embodiments of the present invention prompt the user to confirm the continued use of the determined language. The determined language is added to the set of languages understood fluently by the user in the social network, based on the user's confirmation. Embodiments can use the adjusted set of languages understood fluently by the user, to filter messages of social networks received by, or directed to the user.

Figure 1:
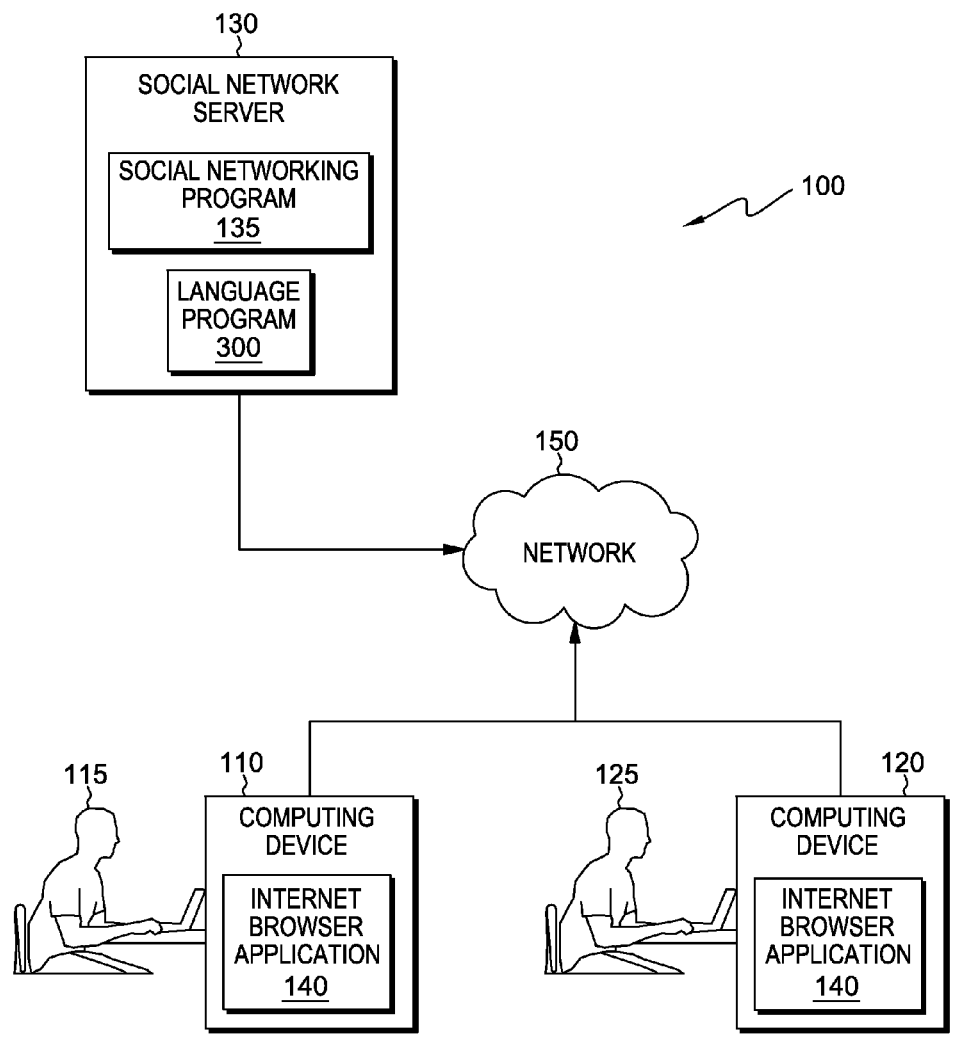
FIG. 1 is a functional block diagram illustrating a distributed computer processing environment, in accordance with an embodiment of the present invention.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments are implemented. Many modifications to the depicted environment can be made by those skilled in the art without departing from the scope of the invention as recited by the claims.

Distributed computer processing environment 100 includes social network server 130, which operates social networking program 135 and language program 300. Also included in distributed computer processing environment 100 is computing device 110, usable by user 115, and computing device 120, usable by user 125. Both computing devices 110 and 120 include an instance of internet browser application 140. All devices and corresponding applications operated by the devices are interconnected through network 150.

Network 150 can be, for example, a local area network (LAN), a telecommunications network, a wide area network (WAN), such as the Internet, a virtual local area network (VLAN), or any combination that can include wired, wireless, or fiber optic connections. In general, network 150 can be any combination of connections and protocols that will support communications between computing devices 110 and 120, social network server 130, and other components of distributed computer processing environment 100 (not shown), in accordance with embodiments of the present invention.

Computing device 110 is operated by user 115. Computing device 110 includes an instance of Internet browser application 140, which enables user 115 to access social network server 130, via network 150. User 115, operating computing device 110, accesses a social networking application operating on social network server 130, to generate content viewable by other users accessing social network server 130. User 115 receives online social network content while accessing social network server 130, using Internet browser application 140, via network 150. The online social network content received by user 115 includes social networking messages that user 115 has subscribed to, messages from authors the user follows, and messages the user views from browsing and searching within a social networking application, such as social networking program 135.

Similarly, computing device 120 is operated by user 125. Computing device 120 includes an instance of Internet browser application 140, which enables user 125 to access social network server 130, via network 150. User 125, operating computing device 120, accesses social networking program 135, operating on social network server 130, to generate content viewable by other users accessing social network server 130. User 125 also receives online social network content, which is similar to that of user 115, while accessing social network server 130, using Internet browser application 140, via network 150.

Users 115 and 125 access social network server 130 by operating computing devices 110 and 120 respectively. Users 115 and 125 are each identified by a social network application profile (not shown) that includes information associated with a language used by users 115 and 125 respectively, to generate or write content, herein also referred to as posting, and receive and view content, herein also referred to as following and/or subscribing. The respective social networking profiles of users 115 and 125 assume a language fluently understood by user 115 and user 125 respectively, based on their respective country location or other information included in their respective social network application profiles.

In some embodiments of the present invention, computing device 110 and computing device 120 can be one of, a web server, a mobile computing device, a laptop computer, a tablet computer, a netbook computer, a personal computer (PC), a desktop computer, or any programmable electronic device or computing system capable of receiving and sending data, and performing computer readable program instructions capable of communicating with social network server 130, via network 150. In other embodiments, computing device 110 and computing device 120 can represent virtual instances operating on a computing system utilizing clustered computers and components (e.g., database server computer, application server computers, etc.) that act as a single pool of seamless resources when accessed within distributed computer processing environment 100. Computing devices 110 and 120 include internal and external hardware components, as depicted and described further with reference to FIG. 4.

Social network server 130 is a web-based server hosting social networking program 135, and includes operational access of language program 300, in accordance with an embodiment of the present invention. Social network server 130 receives content from users with recognized profiles that have accessed social networking program 135, via network 150.

Social network server 130 can be a web server, a blade server, a mobile computing device, a laptop computer, a tablet computer, a netbook computer, a personal computer (PC), a desktop computer, or any programmable electronic device or computing system capable of receiving and sending data, via network 150, and performing computer-readable program instructions. In another embodiment, social network server 130 represents a computing system utilizing clustered computers and components (e.g., database server computer, application server computers, etc.) that act as a single pool of seamless resources, such as in a cloud computing environment, when accessed within distributed computer processing environment 100. Social network server 130 includes internal and external hardware components, as depicted and described with reference to FIG. 4.

Social networking program 135 is a communication application which users access to generate content to be shared with other users of the social networking program. Often, users access social networking program 135 to view content generated by other users and respond by commenting on the existing content, or generating new content. Generating new content includes writing, composing, or authoring a message and posting the message within the social networking application for other users to view, receive, subscribe to, or follow. Users of social networking program 135 are identified by a user name or user ID, which is unique for a particular user. Users have an associated profile that includes information regarding the user, such as a preferred language, general location, and indication of the activity level and experience of the user relative to participation in social networking program 135. In one embodiment of the present invention, social networking program 135 includes one or more topic areas in which users choose to generate content and submit or "post" the content to the application, to be shared with other users of the application. Social networking program 135 makes the generated content available to users to view by browsing or searching. Additionally, in some embodiments of the present invention, social networking program 135 enables users to select generated content to which the user can subscribe, or follow, by topic or author. The user who subscribes or follows other posted social networking content, receives notification from social networking program 135 when newly generated content is made available for viewing. In other embodiments, social networking program 135 identifies other users having a similar interest, and makes the identification of the other users with the similar interest available to a user having a posting or viewing history with the same interest.

The content generated by users of social networking program 135 often includes written text, authored by a first user and submitted to social networking program 135 to be viewed by one or more other users. In some embodiments of the present invention, content is generated and made available to all users of social networking program 135. In other embodiments, generated content is available based on the content topic and the user selected topic of interest. In some embodiments, the content of a social networking application includes one or more of: images, video, audio, listing of numeric data, graphs, graphics, and file attachments. Images, video, and numeric listing, can be language independent, unless accompanied with descriptions, sub-titles, or audio content. Audio content is provided in a user specified language, and the language of the content is recognized by speech recognition technologies associated with audio language libraries. The language of written content of file attachments can be recognized by analyzing and comparing content to language libraries, for example.

Figure 2:
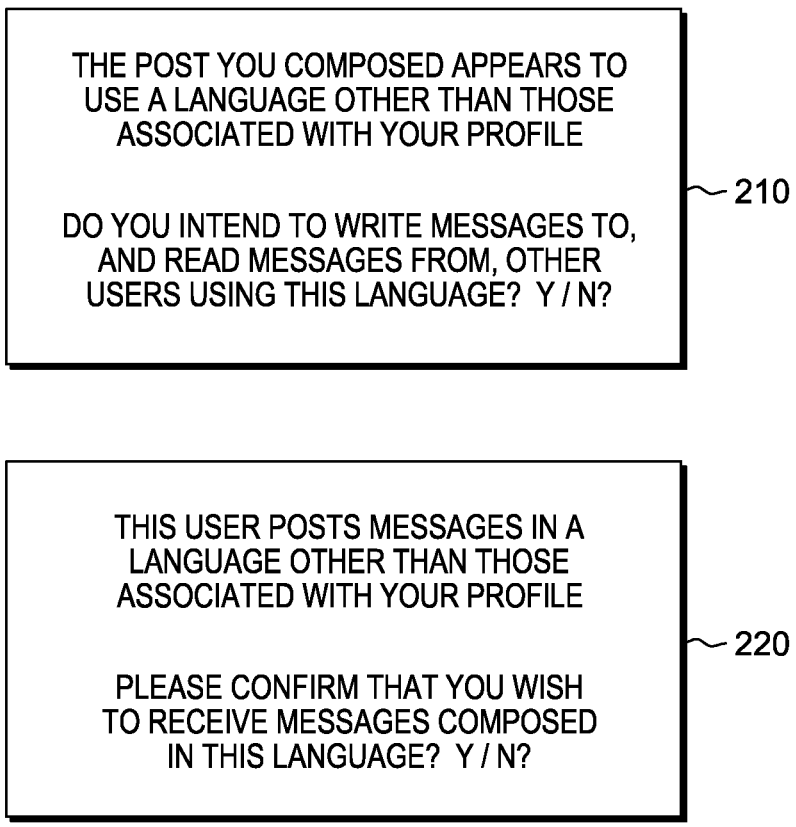
FIG. 2 is a functional block diagram depicting exemplary messages displayed to users, in accordance with an embodiment of the present invention.

FIG. 2 is a functional block diagram depicting exemplary messages displayed to users, in accordance with an embodiment of the present invention. FIG. 2 includes content generating notification 210, and content viewing notification 220. In some embodiments of the present invention, a user is associated with a default language in which the user participates in social networking. A user of a social networking application, for example, social networking program 135, generates content which is often in the form of a written text message. Based on the location associated with the user or the location associated with the social networking program, the language used to generate content can be assumed by the social networking program to be in a default language. Language program 300 analyzes the content generated by a user of a social network and determines the language in which the content was generated. Content generating notification 210 is a message presented to a user of social networking program 135, in response to language program 300, determining the language of content generated by the user to be different than a set of languages understood fluently by the user. In response to generating content on social networking program 135, in a language that is not represented in the set of languages associated with the user, the user is presented with notification 210.

In one embodiment of the present invention, the set of languages associated with the user are included in a profile or settings file associated with the user for a particular social networking application. The set of languages can include a single default language, or can include multiple languages that have accrued as a result of embodiments of the present invention, or other methods, such as manually selecting languages from a listing, to add to the set of languages included in a profile.

For instances of social networking in which the user views multiple content pieces, subscribes to an author or topic, or selects to follow an author or topic, language program 300 analyzes the content viewed by the user and determines the language used to generate the content. If the language of the content is not found in the set of languages that the user has confirmed to understand fluently (able to read and write fluently using this language), language program 300 presents content viewing notification 220, prompting the user as to whether the user intends to continue receiving content produced in the determined language. On confirmation by the user, the language is added to the set of fluently understood languages for the user, and the languages included in the set are used to filter the social networking content received by the user.

For example, if user 115 (see FIG. 1), subscribes to content generated, or posted by user 125, on social networking program 135, language program 300 analyzes the posted content to determine the language in which the content has been authored. Language program 300 makes use of language libraries that include applicable language-specific characters, words, and phrases, to identify the language in which content has been generated. Language program 300 compares the language of the content posted by user 125, for example, German language, to the set of languages the user has confirmed to have fluent understanding, for example, English and Spanish languages. Because the content posted by user 125 is in German, which is not included in the set of languages associated with user 115, language program 300 presents content viewing notification 220 to user 115, prompting user 115 to confirm an intent to continue receiving and viewing additional content posted in German. Language program 300 responds to a confirmation by user 115, by adding German to the set of languages associated with user 115.

Embodiments of the present invention avoid the need for users to create a false identity associated with different languages, as a work-around to allow the user to post and receive social network messages in a language other than a default language. Additional languages in which a user is fluent, can be automatically added to a set of languages associated with a user, by confirmation of a prompting message presented to the user, as a result of language program 300 determining the posted or viewed content to be in a language other than those currently associated with the user.

Figure 3:
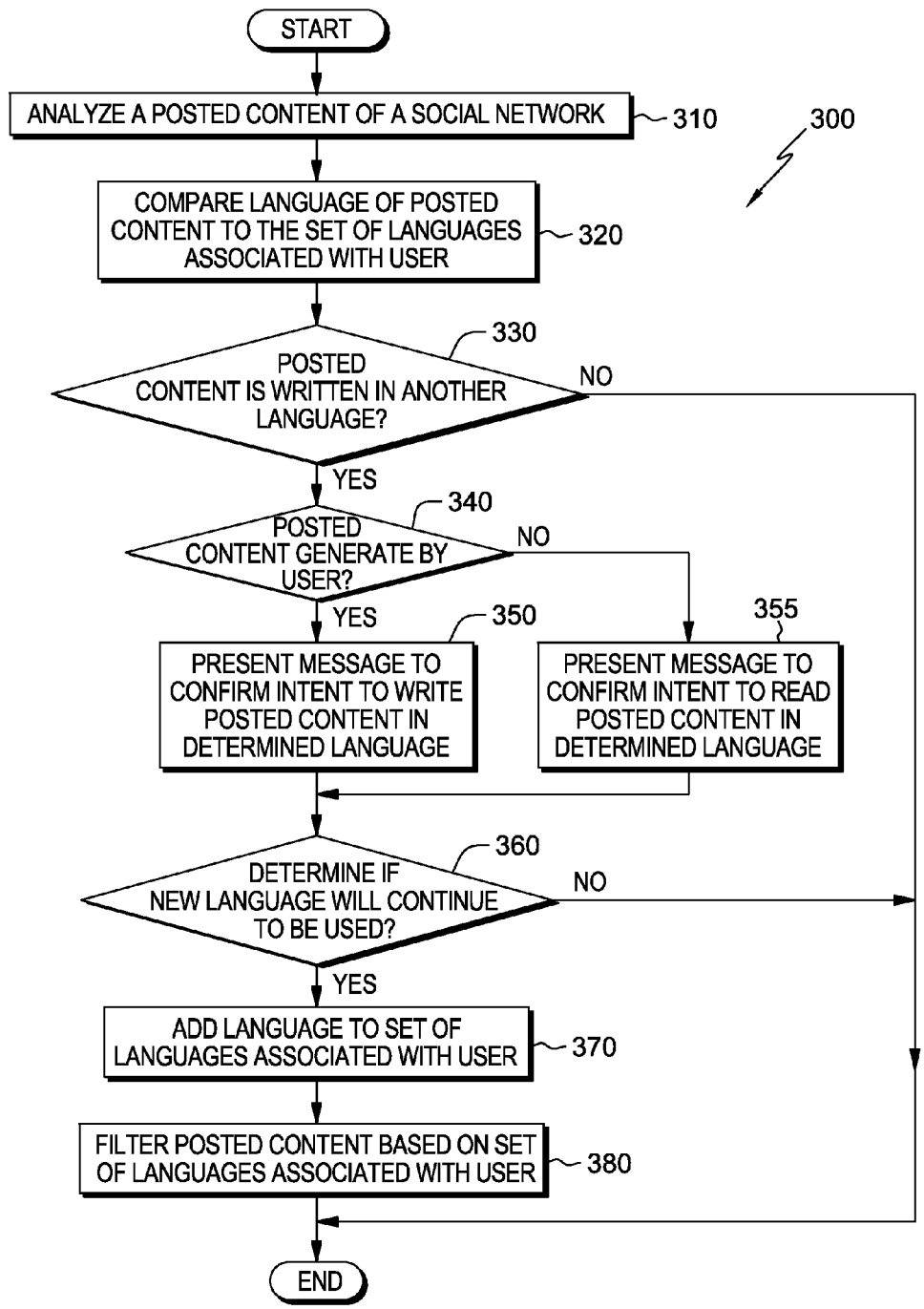
FIG. 3 illustrates operational steps of a language program, operating on a social network server within the distributed computing environment of FIG. 1, in accordance with an embodiment of the present invention.

FIG. 3 illustrates operational steps of language program 300, operating on social network server 130 within the distributed computer processing environment of FIG. 1, in accordance with an embodiment of the present invention. Language program 300 analyzes a posted content of a social network (step 310). Social networking content is often referred to as a posting or a post, which is generated by a user of a social network, and can be received or viewed by other users of the social network. The posting is analyzed by language program 300 to determine the language used to create the posting. Language program 300 determines characters, words, and phrases used within the message and determines the most likely language corresponding to the identified characters, words, and phrases. In some embodiments of the present invention, language program 300 accesses language dictionaries, frequently-used word tables, or language libraries, to identify words associated with a particular language. In one embodiment, language program 300 determines a probability of the posted content corresponding to a particular language, and selects the language corresponding to the highest probability, hereafter referred to as the determined language. In other embodiments, language program 300 submits the posted content to multiple translation functions and determines the language of the posting by the language translation most similar to the original content.

Having analyzed the posted content of the social network, language program 300 compares the determined language of the posted content to the set of languages associated with the user (step 320). The user is associated with a listing or set of languages the user understands fluently, indicating the user is adept at reading and writing in each language included in the set of languages. Language program 300 compares the determined language of the social network posting to the set of languages associated with the user, in which the user has a fluent understanding of the set of languages.

For example, language program 300 determines that a posting within social networking program 135 is associated with user 115. The posting is determined by language program 300 to have been created using Spanish language, as a result of identifying words and phrases that are relatively unique to the Spanish language. Language program 300 compares the determination of the posting having been created in the Spanish language to the set of languages that user 115 understands fluently.

Having determined the language used to generate the posting, language program 300 determines if the posting is composed in another language (decision step 330). The comparison, by language program 300, of the determined language of the posting to the set of languages understood fluently by the user, identifies whether the posting language is one of the languages found within the set of languages associated with the user. Determining that the posting is composed in a language included in the set of languages associated with the user, language program 300 ends (step 330, "NO" branch).

Determining that the posting is generated using another language which is not included in the set of languages understood fluently by the user, (step 330, "YES" branch), language program 300 determines if the posting is generated or viewed by the user (decision step 340).

In one instance, language program 300 determines that the content of the posting was generated by the user (step 340, "YES" branch). Content posted within a social network application, such as social networking program 135, associates a user with each content posting, typically by associating a user's identification (ID) with the posted content. In one embodiment of the present invention, language program 300 determines whether the posted content is generated by the user, based on the user ID corresponding to the generation of the posted content. For example, language program 300 determines that the user ID corresponding to a posted content is the ID for user 115, and therefore the posted content was generated by user 115.

Having determined that the user generated the posted message, language program 300 presents the user with a prompting message confirming the intent to write additional posts in the new language (step 350). In some embodiments of the present invention, content generating social network notification 210 is the prompting message presented to the user to confirm an intent to post additional messages in the social media application, using the determined language. In other embodiments, other similar messages are presented to the user, such that the user confirms an intent to continue to generate posted content using the determined language.

For example, language program 300 determines that the language of a posting generated by user 115 is not found in the set of languages associated with the user. Language program 300 presents content generating notification 210 to user 115 to obtain a response confirming or refuting the intent to continue to post messages, in social networking program 135, using the determined language, which is in addition to the set of languages user 115 understands fluently. Content generating notification 210 acknowledges the posted message as having been written in a language not found in user 115's set of languages, and requests a response as to whether the user intends to continue to post messages in the new language.

Alternatively, determining that the posted content is not written by the user, but is received by the user (step 340, "NO" branch), language program 300 presents content viewing notification 220 to the user to obtain a response confirming or refuting the intent to continue to view posted messages, in social networking program 135, which are written using the language new to the set of languages associated with the user (step 355). Content viewing message 220 acknowledges that the author of the viewed posting composes messages which are written in a language other than the set of languages associated with the user, and requests a response as to whether the user wishes to receive additional posted messages written in the other language.

For example, language program 300 determines that user 115 is viewing a posted content on social networking program 135, and the language used to generate the posting is not found in the set of languages associated with user 115. Language program 300 presents content viewing notification 220 to user 115 to obtain a response confirming or refuting the intent to continue to receive and view, in social networking program 135, posted content composed using the language, which is in addition to the set of languages user 115 understands fluently. Content viewing notification 220 acknowledges the posted message as having been generated in a language not found in user 115's set of languages, and requests a response as to whether the user intends to continue to view posted content in this language.

Having received input from the user, language program 300 determines whether the new language will continue to be used with posted messages (decision step 360). Input from the user confirming or refuting the continued use of the new language is received by language program 300, and determining that the user will not continue to use the new language (step 360, "NO" branch), language program 300 ends. Alternatively, determining that the user wishes to continue to use the determined language (step 360, "YES" branch), language program 300 adds the determined language to the set of languages understood fluently by the user (step 370).

Language program 300 considers confirmation of continued use to include the use of the newly added language for both the writing of messages that are posted in the social networking application, and the viewing of social network messages, which are written by other users. By adding the determined language to the set of languages the user fluently understands, language program 300 does not subsequently present prompting messages when the user generates messages or views messages that use the determined language.

Language program 300 uses the set of languages associated with the user, including the addition of the determined language, to filter posted content based on the set of languages associated with the user (step 380). In one embodiment of the present invention, language program 300 uses the set of languages associated with the user to filter the content sent directly to the user, blocking the postings that have been composed using a language not found in the set of languages associated with the user. The blocking of posted content includes, but is not limited to, preventing the presentation of messages to the user, or storing the messages separately and informing the user of the receipt of messages written in a language not found in the set of languages associated with the user. In other embodiments of the present invention, the filtering behavior of language program 300, based on the set of languages that the user understands fluently, is determined by a user-selected profile setting.

Having added the determined language to the set of languages understood fluently by the user, and enabling filtering of messages based on the set of languages, language program 300 ends.

In another embodiment of the present invention, language program 300 receives input indicating a user preference to use a single language for composing and viewing social network content. In response to receiving indication of the single language preference, language program 300 represses the prompting notifications, for example content generating notification 210, and content viewing notification 220. In one embodiment, the user preference to use a single language for composing and viewing social network content is received from a user profile for the social network. In another embodiment, the user preference to use a single language is received from a user setting associated with language program 300.

Figure 4:
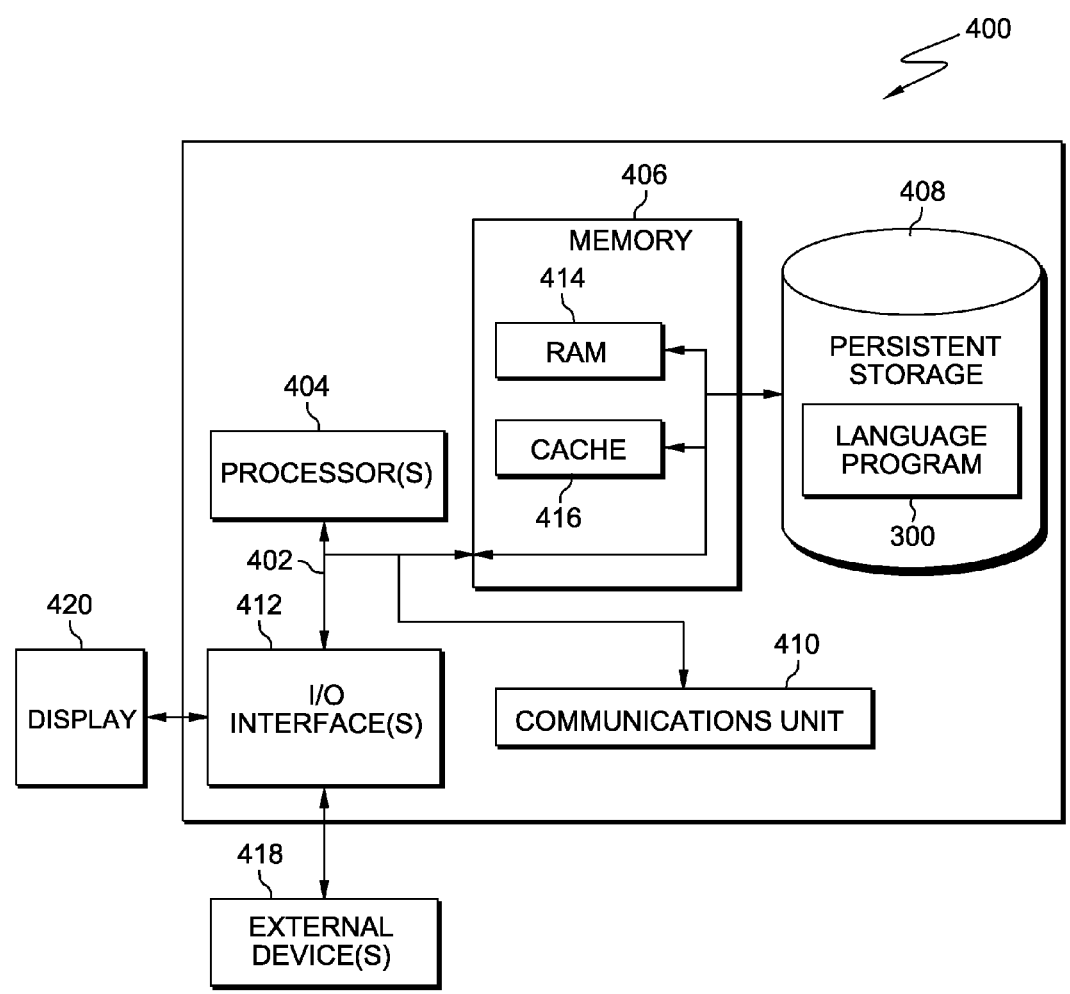
FIG. 4 depicts a block diagram of components of a computing device capable of operating the language program, in accordance with an embodiment of the present invention.

FIG. 4 depicts a block diagram of components of server 400 capable of operating language program 300, and components also found in social network server 130, computing devices 110 and 120, in accordance with an embodiment of the present invention. It should be appreciated that FIG. 4 provides only an illustration of one implementation and does not imply any limitations with regard to the environments in which different embodiments are implemented. Many modifications to the depicted environment may be made.

Server 400, social network server 130, and computing devices 110 and 120, include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Language program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed communication processing environment 100. In these examples, communications unit 410 includes one or more network interface cards. Communications unit 410 may provide communications through the use of either or both physical and wireless communications links. Operating language program 300 may be downloaded to persistent storage 408 through communications unit 410.

I/O interface(s) 412 allows for input and output of data with other devices that may be connected to server 400, social network server 130, and computing devices 110 and 120. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., operating language program 300, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for filtering messages of a social network, the method comprising:
    a computer processor identifying a set of languages included in a settings file of a first user of a social network;
    a computer processor determining which language is used to compose a message sent or received by the first user of the social network, by accessing a language library, wherein the message sent or received by the first user of the social network is an audio message that is converted in part to text using speech recognition and audio language libraries for determining a language in which the audio message is composed;
    a computer processor determining whether a language that is used to compose the message is included in the set of languages of the settings file of the first user of the social network;
    in response to determining that the message that is sent is composed in a language that is not included in the set of languages of the settings file of the first user, prompting, by a computer processor, the first user to indicate whether the language is to be added to the set of languages of the first user;
    in response to determining that the message that is received is composed in a language that is not included in the set of languages of the settings file of the first user, prompting, by a computer processor, the first user to indicate whether the language is to be added to the set of languages of the first user;
    in response to receiving a confirmation from the first user to add the language to the set of languages of the first user, a computer processor adding the language to the set of languages of the first user; and
    in response to a denial by the first user to add the language to the set of languages of the first user, a computer processor filtering messages composed in the language that are directed to the first user from the social network wherein the messages that are filtered are blocked from display to the first user of the social media network.

2. The method of claim 1, wherein the message received by the first user corresponds to at least one of: a notification of a new posting, a delivery of content associated with a subscription to the social network, and content received as a result of following an author of one or more postings on the social network.

3. The method of claim 1, further comprising:
    in response to the computer processor receiving a confirmation from the first user to add the language to the set of languages of the settings file of the first user, a computer processor suppressing subsequent prompting of the first user to confirm adding the language to the set of languages in the settings file of the first user.

4. The method of claim 1, wherein the audio message that is composed by the first user of the social network is converted in part to at least one of:
    an SMS message, an email message, or a notification.

5. The method of claim 1, wherein filtering, by a computer processor, messages composed in the language that are directed to the first user of the social network includes a separate storage of the message that is composed in the language.

6. A computer program product for filtering messages of a social network, the computer program product comprising:
    one or more computer readable storage media having program instructions embodied therewith, wherein the program instructions are executable by a computer processor, the program instructions comprising:
        program instructions to identify a set of languages included in a settings file of a first user of a social network,
        program instructions to determine which language is used to compose a message sent or received by the first user of the social network, by accessing a language library, wherein the message sent or received by the first user of the social network is an audio message that is converted in part to text using speech recognition and audio language libraries for determining a language in which the audio message is composed;

program instructions to determine whether a language that is used to compose the message that is sent or received is included in the set of languages of the settings file of the first user of the social network;

in response to determining that the message that is received is composed in a language that is not included in the set of languages of the settings file of the first user, program instructions to prompt the first user to indicate whether the language is to be added to the set of languages of the first user:

in response to determining that the message that is sent is composed in a language that is not included in the set of languages of the settings file of the first user, program instructions to prompt the first user to indicate whether the language is to be added to the set of languages of the first user;

in response to receiving a confirmation from the first user to add the language to the set of languages of the first user, program instructions to add the language to the set of languages of the first user; and in response to a denial by the first user to add the language to the set of languages of the first user, program instructions to filter messages composed in the language that are directed to the first user from the social network, wherein the messages that are filtered are blocked from display to the first user of the social network.

7. The computer program product of claim 6, wherein program instructions to filter messages composed in the language that are directed to the first user from the social network includes a separate storage of the message that is composed in the language.

8. The computer program product of claim 6, wherein the message received by the first user of the social network corresponds to at least one of: a notification of a new posting, a delivery of content associated with a subscription to the social network, and content received as a result of following an author of one or more postings on the social network.

9. The computer program product of claim 6, further comprising:
in response to the computer processor receiving a confirmation from the first user to add the language to the set of languages of the settings file of the first user, program instructions to suppress subsequent prompting of the first user to confirm adding the language to the set of languages in the settings file of the first user.

10. A computer system for filtering messages of a social network, the computer system comprising:
one or more computer processors;
one or more computer readable storage media; and
program instructions stored on the computer readable storage media for execution by at least one of the one or more processors, the program instructions comprising:

program instructions to identify a set of languages included in a settings file of a first user of a social network;

program instructions to determine which language is used to compose a message sent or received by the first user of the social network, by accessing a language library, wherein the message sent or received by the first user of the social network is an audio message that is converted in part to text using speech recognition and audio language libraries for determining a language in which the audio message is composed;

program instructions to determine whether a language that is used to compose the message that is sent or received is included in the set of languages of the settings file of the first user of the social network;

in response to determining that the message that is received is composed in a language that is not included in the set of languages of the settings file of the first user, program instructions to prompt the first user to indicate whether the language is to be added to the set of languages of the first user;

in response to determining that the message that is sent is composed in a language that is not included in the set of languages of the settings file of the first user, program instructions to prompt the first user to indicate whether the language is to be added to the set of languages of the first user;

in response to receiving a confirmation from the first user to add the second language to the set of languages of the first user, program instructions to add the language to the set of languages of the first user; and in response to a denial by the first user to add the language to the set of languages of the first user, program instructions to filter messages composed in the language that are directed to the first user from the social network, wherein the messages that are filtered are blocked from display to the first user of the social network.

11. The computer system of claim 10, wherein program instructions to filter messages composed in the language that are directed to the first user from the social network includes a separate storage of the message that is composed in the language.

12. The computer system of claim 10, wherein the message received by the first user of the social network corresponds to at least one of: a notification of a new posting, a delivery of content associated with a subscription to the social network, and content received as a result of following an author of one or more postings on the social network.

13. The computer system of claim 10, further comprising:
in response to the computer processor receiving a confirmation from the first user to add the language to the set of languages of the settings file of the first user, program instructions to suppress subsequent prompting of the first user to confirm adding the language to the set of languages in the settings file of the first user.

* * * * *